F. D. THOMAS.
STAGE EFFECT.
APPLICATION FILED FEB. 27, 1915.
1,186,451.
Patented June 6, 1916.
5 SHEETS—SHEET 1.
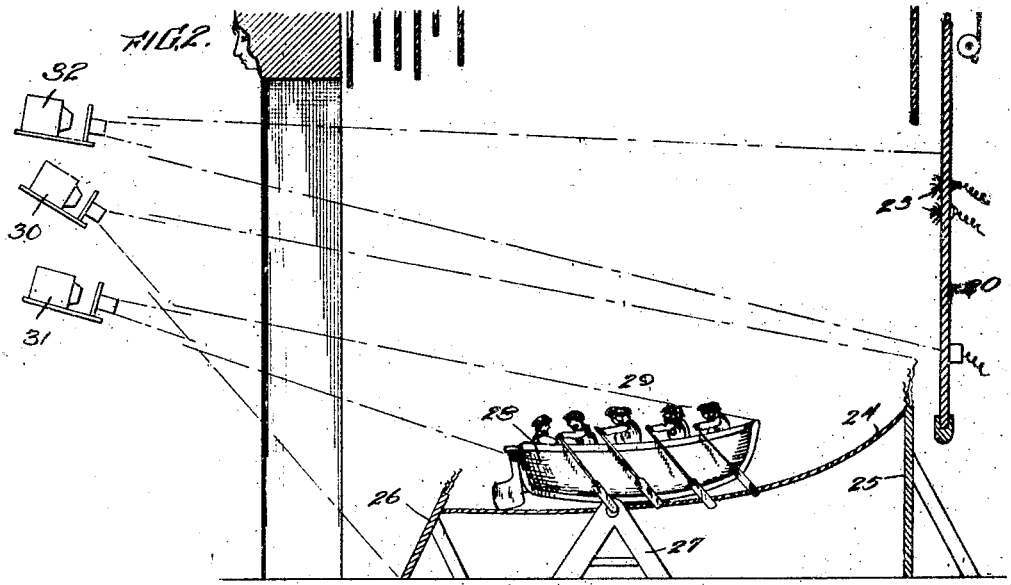
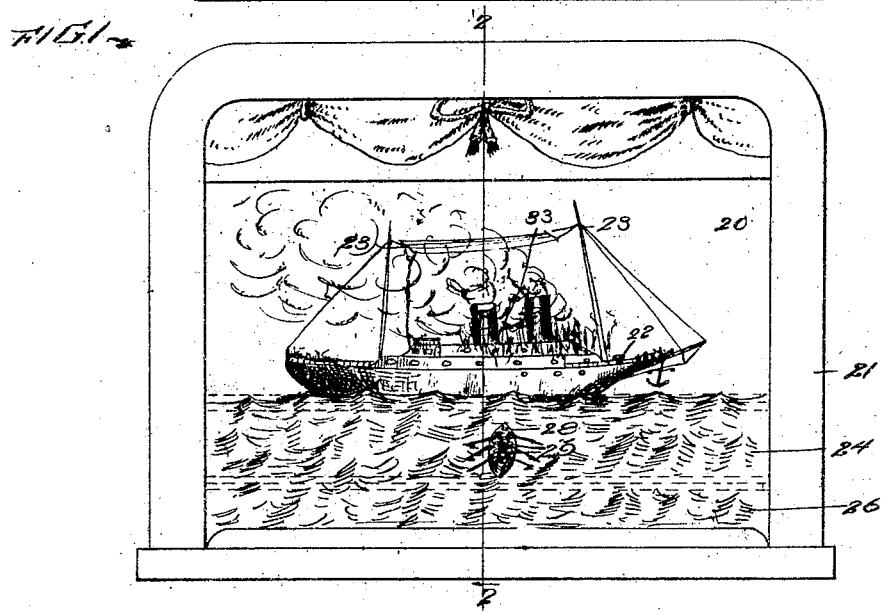
Witnesses
Inventor
Frank D. Thomas
By Mason Fenwick Lawrence
Attorneys

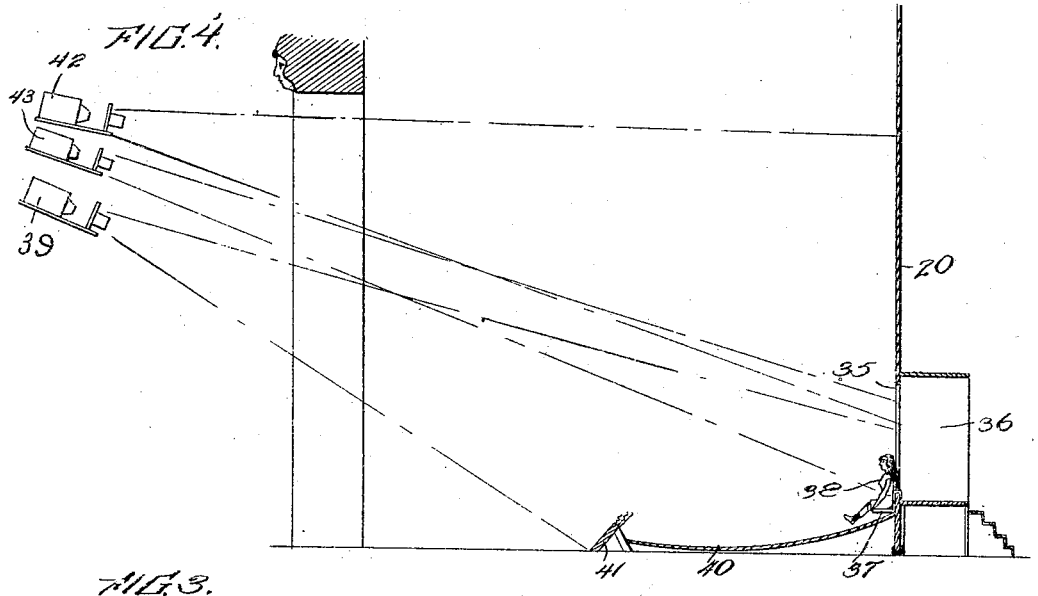
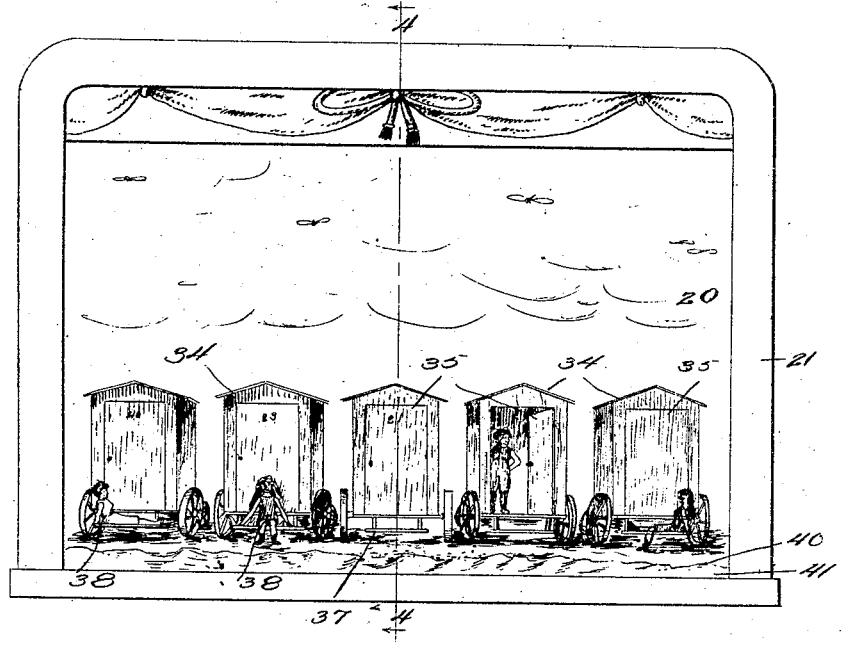

F. D. THOMAS.
STAGE EFFECT.
APPLICATION FILED FEB. 27, 1915.
1,186,451.
Patented June 6, 1916.
5 SHEETS—SHEET 3.
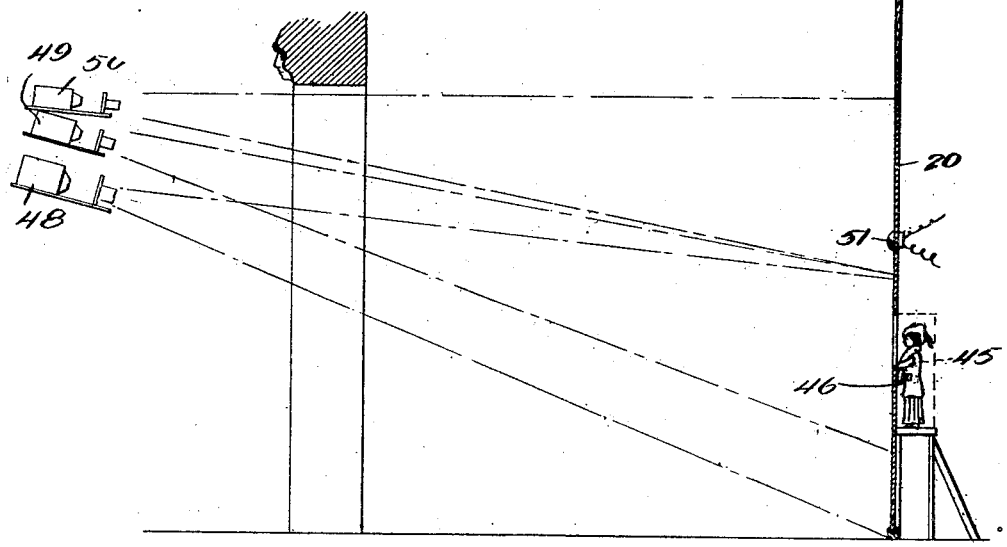
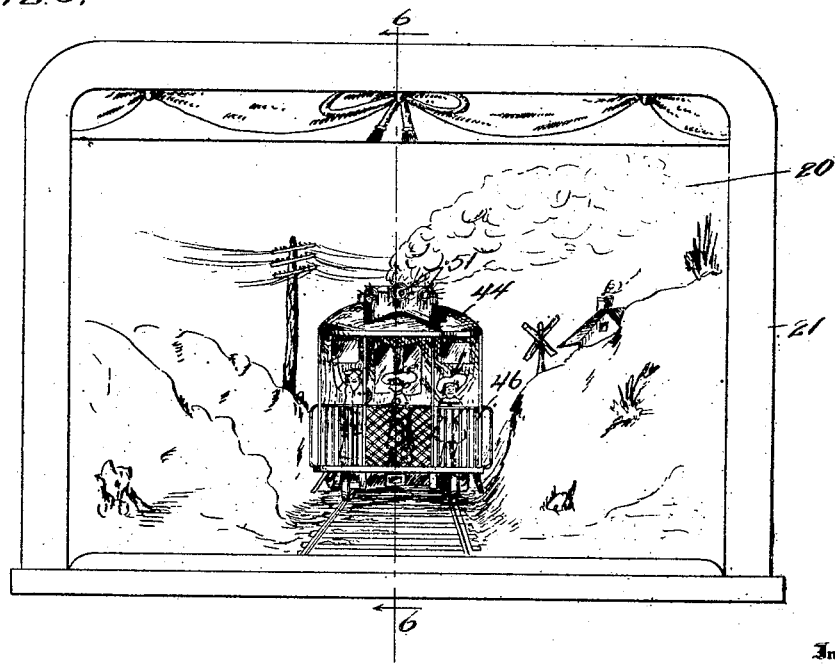
Witnesses
Inventor
Frank D. Thomas
By
Attorneys F. D. THOMAS.
STAGE EFFECT.
APPLICATION FILED FEB. 27, 1915.
1,186,451.
Patented June 6, 1916.
5 SHEETS—SHEET 4.
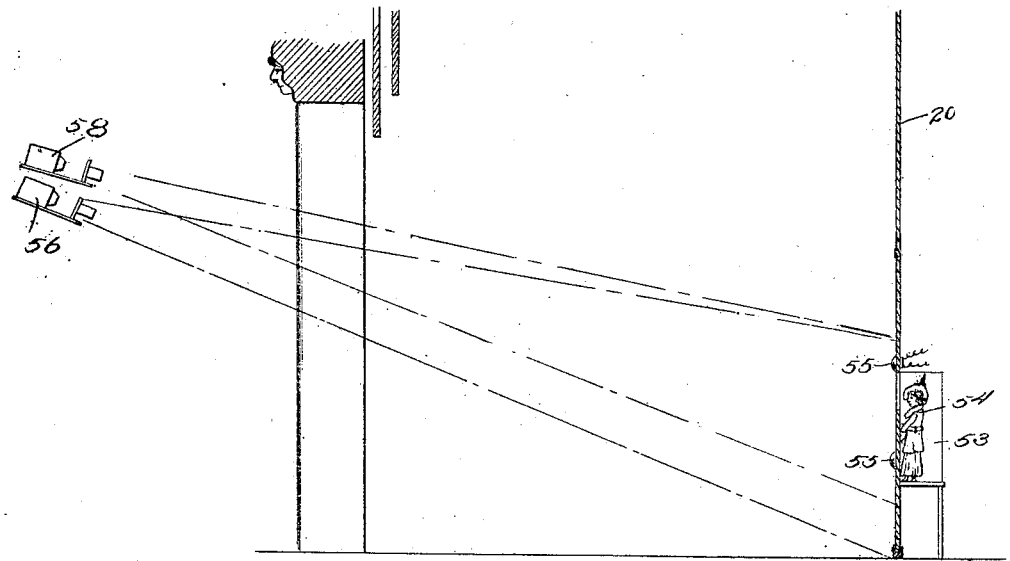
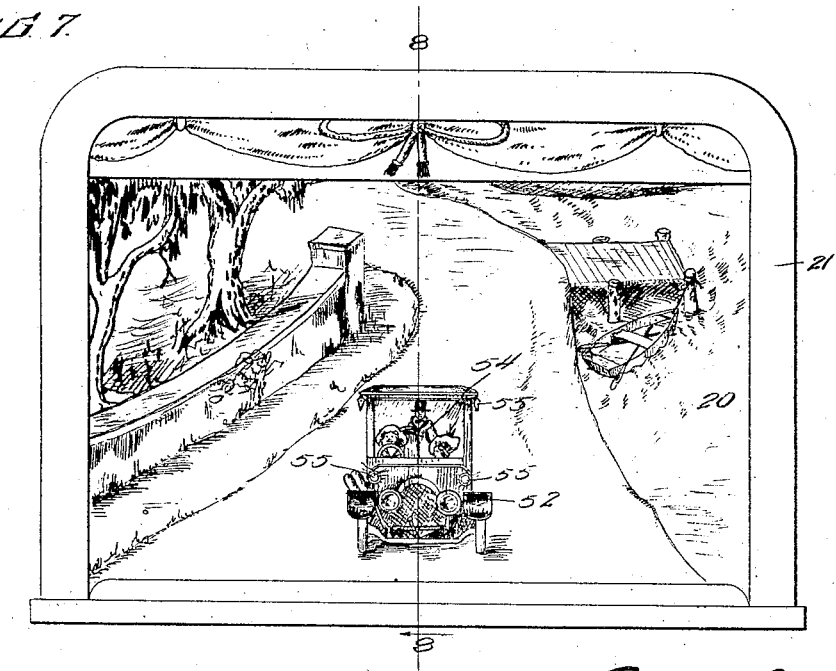

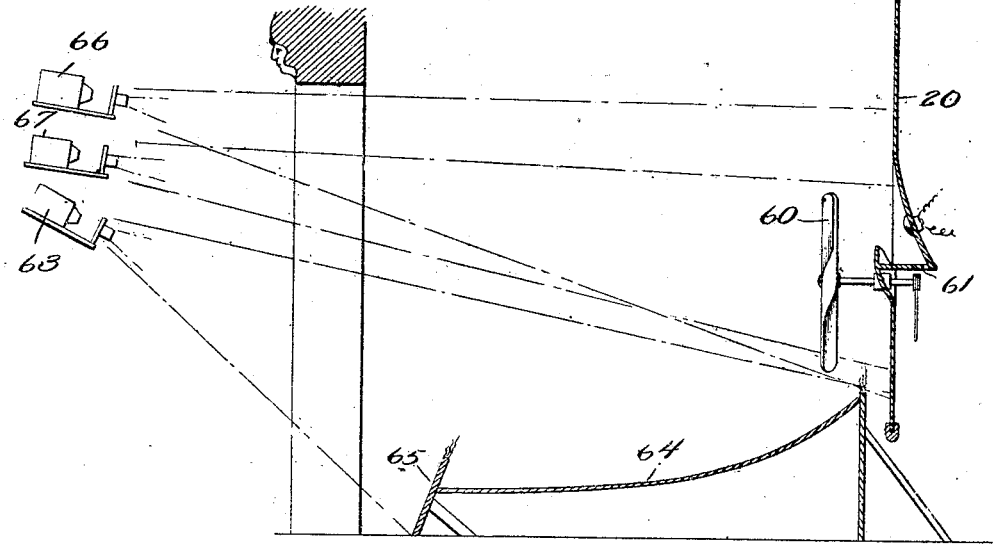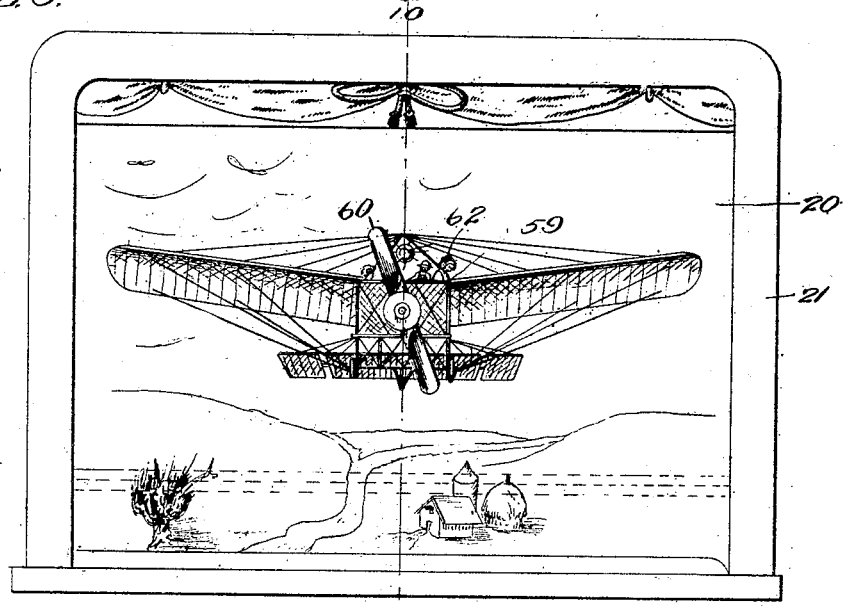

UNITED STATES PATENT OFFICE.

FRANK D. THOMAS, OF NEW YORK, N. Y.

STAGE EFFECT.

1,186,451.     Specification of Letters Patent.     Patented June 6, 1916.

Application filed February 27, 1915. Serial No. 11,031.

*To all whom it may concern:*

Be it known that I, FRANK D. THOMAS, a citizen of the United States, residing at New York, in the county of New York and State of New York, have invented certain new and useful Improvements in Stage Effects; and I do hereby declare the following to be a full, clear, and exact description of the invention, such as will enable others skilled in the art to which it appertains to make and use the same.

This invention relates to stage effects, and has for an object to provide a scene painted upon a drop, together with living actors and moving picture effect—all combined to produce a single scene.

A further object of the invention is to provide a drop having a scene painted thereon capable of being moved to give the scene painted thereon the appearance of a limited motion combined with living actors and a moving picture scene or scenes thrown upon the screen whereby the entire effect is to produce a single correlated scene.

With these and other objects in view the invention consists in certain features of combination, construction and arrangement of parts as will be hereinafter more fully described and claimed.

In the drawings: Figure 1 shows a screen having the representation of a ship painted thereon with flames appearing to burn the ship, and living actors in front of the screen. Fig. 2 is a sectional view through the scene shown at Fig. 1, taken on line 2—2 of that figure, showing the manner in which the moving pictures are projected upon the combined scene and apparatus. Fig. 3 is a front view of a scene showing bath houses with living actors associated therewith. Fig. 4 is a transverse sectional view taken on line 4—4 of Fig. 3, showing the manner of throwing the moving picture effect upon the apparatus shown at Fig. 3. Fig. 5 is a front view of a scene showing the rear end of a train with moving picture scenery upon opposite sides thereof. Fig. 6 is a transverse sectional view on line 6—6 of Fig. 5, showing the manner of throwing the moving picture effect upon the combined scenery. Fig. 7 is a view showing an automobile in front elevation with moving picture scenery surrounding the automobile. Fig. 8 is a transverse sectional view on line 8—8 of Fig. 7 showing the manner of throwing the moving picture effect upon the combined scenery. Fig. 9 is a front view of a screen showing an aeroplane with scenery above and below. Fig. 10 is a transverse sectional view taken on line 10—10 of Fig. 9 showing the manner of throwing the moving picture effect upon the screen.

Like characters of reference designate corresponding parts throughout the several views.

The improved stage effect which forms the subject-matter of this application comprises a screen 20 properly suspended in a proscenium arch 21 to receive projections from a moving picture lantern in substantially the usual and ordinary manner.

As shown at Figs. 1 and 2, a ship 22 is painted upon the screen 20, and to make such scene more realistic mast lights 23 are inserted in the screen in proper position relative to the mast of the ship 22. In front of the screen 20 a sea cloth 24 is suspended connected at the rear to a support 25, and at the front to a ground row 26. Beneath the sea cloth 24 any convenient support as 27 is erected, and an object as a boat 28 is pivoted thereon to swing. Actors 29 are located in the boat and provided with oars in the usual manner. At any convenient point a moving picture lantern 30 is erected and provided with scenes to throw upon the sea cloth and the boat and the ground row representing waves, breakers, or other marine scenes. A spot light 31 is also provided thrown upon the life-boat and the actors therein to spot out such boat and actors, and also to neutralize the rays of the moving picture thrown thereon. At some other convenient point a moving picture lantern 32 is erected to throw another part of the scene upon the combined apparatus, which in this case are the flames 33 seen at Fig. 1.

It will be obvious that with the apparatus shown at Figs. 1 and 2, the moving picture of the waves or breakers thrown upon the sea cloth and ground row will represent an open ocean with a life-boat therein, while the ship 22 is seen in the distance with the rays from the lantern 32 cast thereon representing flames, apparently the ship being afire, and the life-boat either directed thereto to rescue people therefrom or coming therefrom with rescued people. The screen 20 is mounted to be lowered or otherwise moved so that as the flames consume the ship 22 the screen 20 may be rocked as found desirable and finally lowered to represent the ship being sunk after being consumed by the flames.

As shown at Figs. 3 and 4, the bath-houses 34 painted upon the screen 20 are of course flush with the screen, but doors as 35 are provided to open and boxes 36 are provided at the rear of the screen so that when the doors 35 are opened the appearance is that of the interior of a bath-house. The bath-houses are provided with any conveniences as steps 37, and living actors 38 are associated therewith in any usual, well-known manner. A moving picture lantern 39 conveniently located is employed to throw wave or breaker scenes upon the sea cloth 40 and the ground row 41, while another lantern 42 is employed to throw cloud effects upon the screen 20, and a spot light 43 is employed to spot out the actors and the bath-houses.

At Fig. 5 the rear or observation end 44 of a train is painted directly upon the screen 20 with an opening or box in the back as shown at 45 in Fig. 6 so that actors may stand on such box and out upon the front of the screen as at the railing 46. A spot light lantern 49 is employed to spot out the rear of the train and the actors associated therewith, while a lantern 50 throws cloud effects upon the screen above the landscape. To make the rear end view of the train more realistic rear lights 51 are mounted directly upon the screen 20.

As shown at Fig. 7, the front view of an automobile 52 is painted upon the screen 20, provided with a box 53 in which the actors 54 are positioned, and lights 55 are provided upon the front of the screen to produce the usual effect of the automobile lights. A lantern 56 is employed to throw upon the screen a proper scene surrounding the automobile painted upon the screen 20 to give the effect of the automobile moving, while a spot lantern 58 is employed to spot out the automobile.

As shown at Fig. 9, an aeroplane 59 is painted upon the screen preferably with a physical propeller 60 extending at the front of the screen and driven in any approved manner, with a platform 61 for the actors 62. A lantern 63 is employed to throw upon the ground cloth 64 and ground row 65 a moving picture as seen beneath an aeroplane, while a separate lantern may, if desired, be employed as at 66 to throw in cloud effects. Also a spot lantern 67 is employed to spot out the aeroplane and neutralize the effect of any rays received from either of the moving picture machines.

In all cases the screen 20 is of course movable, so that it may be moved vertically or laterally to represent the motion of the train, the automobile, or the aeroplane; while of course it can also be tilted to show that any of these devices are tilted as they move along through the scenery thrown by the moving picture lantern.

It will be obvious that in all the embodiments shown in the various drawings a single principle is involved: that of painting upon the screen a fixed image; of throwing upon the screen and other screens in the front of the suspended screen moving picture effects from one or more lanterns as the case may require, under, above or around the fixed image upon the screen; while living actors are associated with the fixed image in such way as to appear to be conducting themselves in the usual and ordinary manner under such circumstances. Also the lights shown in connection with the images painted upon the screen bring out much more forcibly the character of the scene painted upon the screen, and are of such character as are ordinarily employed with the image in connection with which they are shown.

I claim:

1. An apparatus for producing scenic stage effect comprising a movable, substantially vertical screen having a permanent representation thereon, a projecting picture apparatus positioned to superpose on a desired part of the permanent representation a correlated scene, a foreground screen, and a projecting picture apparatus positioned to project an independent correlated scene upon the foreground screen.

2. An apparatus for producing scenic stage effect comprising a movable, substantially vertical screen having a permanent representation thereon, a projecting picture apparatus positioned to superpose on a desired part of said permanent representation a correlated scene, a foreground screen, a projecting picture apparatus positioned to project an independent correlated scene upon the foreground, and a spot light positioned to neutralize a portion of the screen.

3. An apparatus for producing scenic stage effect comprising a movable, substantially vertical screen having a permanent representation thereon, a projecting picture apparatus adapted to superpose on a desired part of said permanent representation a correlated scene, a foreground screen, a projecting picture apparatus for projecting an independent correlated scene upon the foreground screen, means to introduce living actors into the scene, and a spot lantern positioned to spot out the living actors.

4. An apparatus for producing scenic stage effect comprising a movable, substantially vertical screen having a permanent representation thereon, living actors associated with the representation upon the screen, a projecting picture apparatus positioned to project a moving picture upon the screen, a spot lantern positioned to spot out the living actors and means to move the screen.

5. An apparatus for producing scenic stage effect comprising a substantially vertical movable screen having a fixed representation thereon, of a projecting picture apparatus positioned to project upon the representation a desired part of an entire scene and correlated therewith, a second projecting picture apparatus positioned to project a second portion of a correlated scene, living actors associated with the scene, and a spot light positioned to spot out the living actors.

6. The method of producing stage effect consisting in employing a screen having a permanent representation thereon, throwing upon the screen moving scenes correlated with the permanent representation thereon, introducing living actors into the scene and moving the screen to produce a movement of the permanent representation thereon relative to the moving scenes.

7. The method of producing stage effect consisting in employing a screen having a permanent representation thereon, throwing upon the screen a moving picture scene correlated with the permanent representation, introducing living actors into the scene, throwing a spot light upon the living actors and producing a movement of the permanent scene in its entirety.

8. The method of producing stage effects consisting in employing a movable screen having a permanent representation thereon, throwing a plurality of moving picture scenes upon the screen all of which are correlated with the permanent representation, introducing living actors into the scene and changing the correlation of the permanent representation relative to the general positioning of the moving pictures upon the screen.

In testimony whereof I affix my signature in presence of two witnesses.

FRANK D. THOMAS.

Witnesses:
BENNY EISINGER,
JEAN C. HANEZ.